United States Patent Office 2,969,644
Patented Jan. 31, 1961

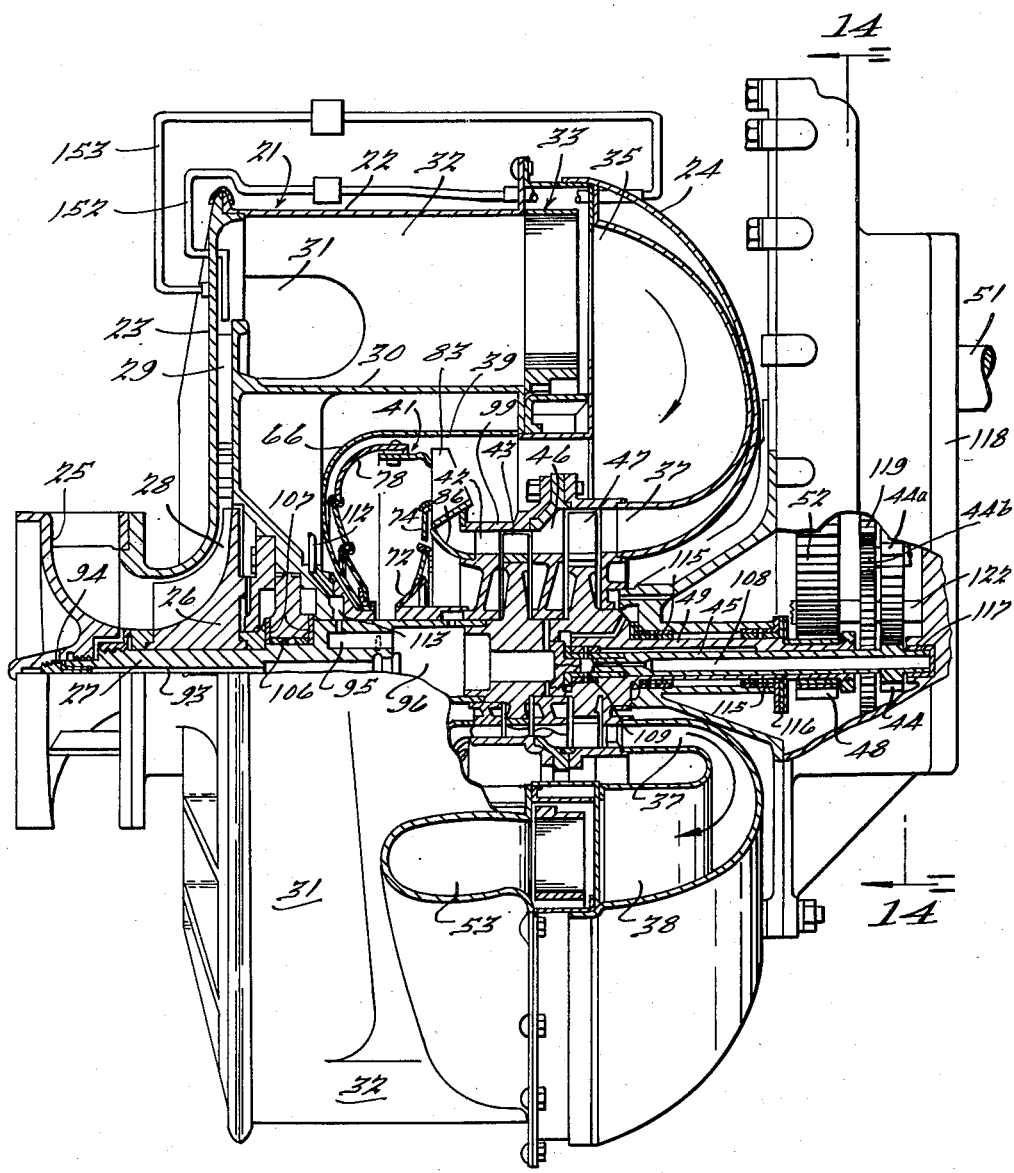

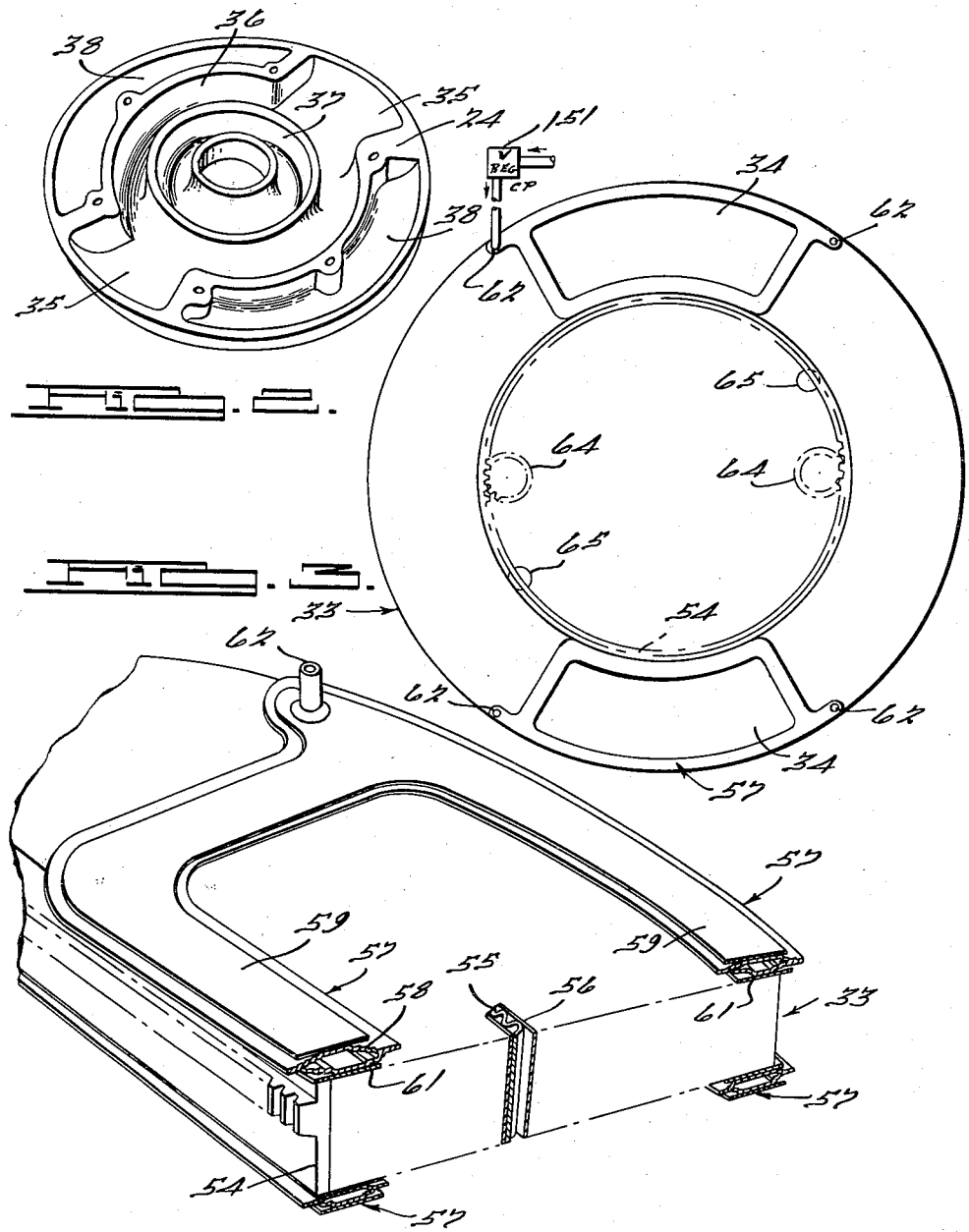

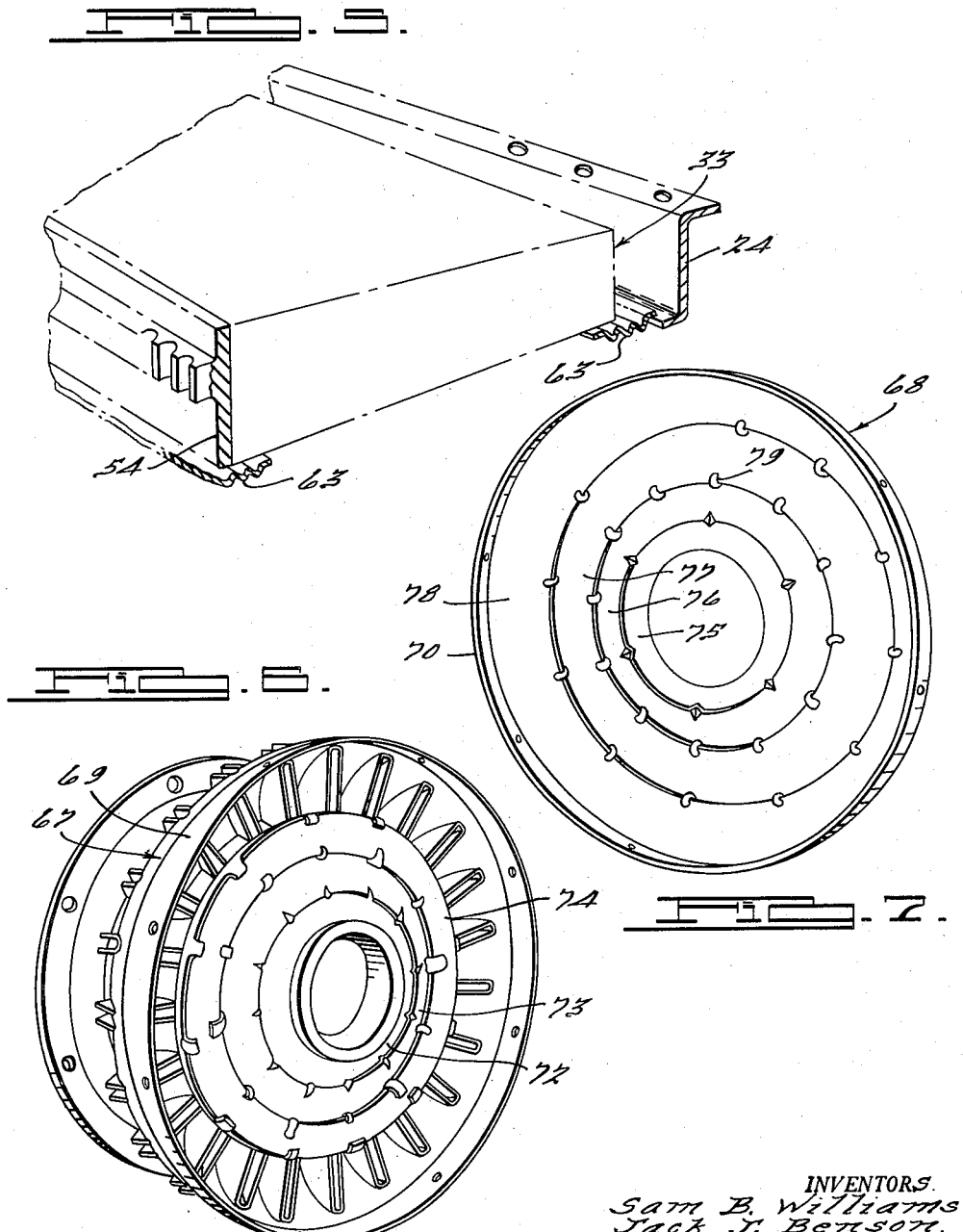

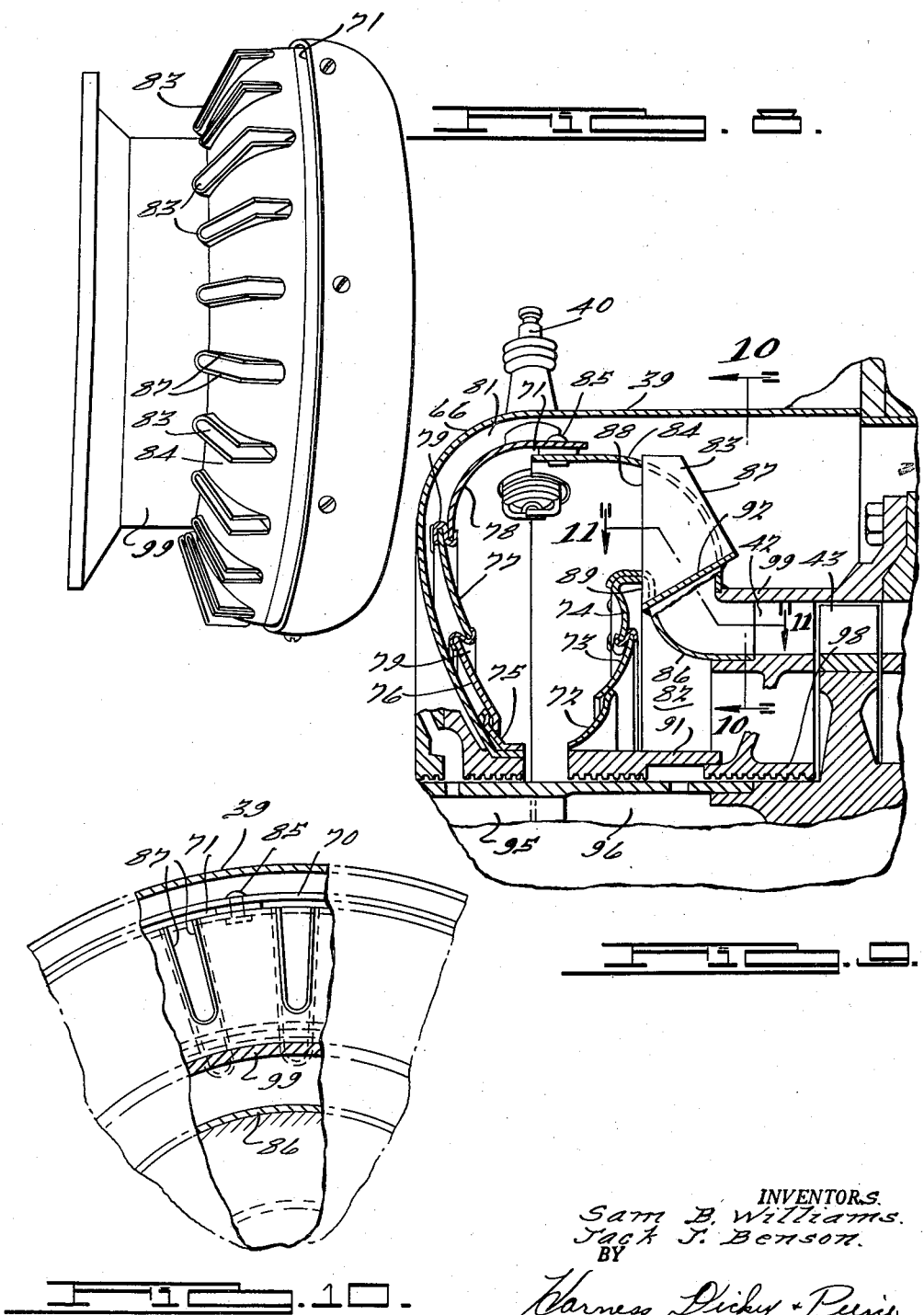

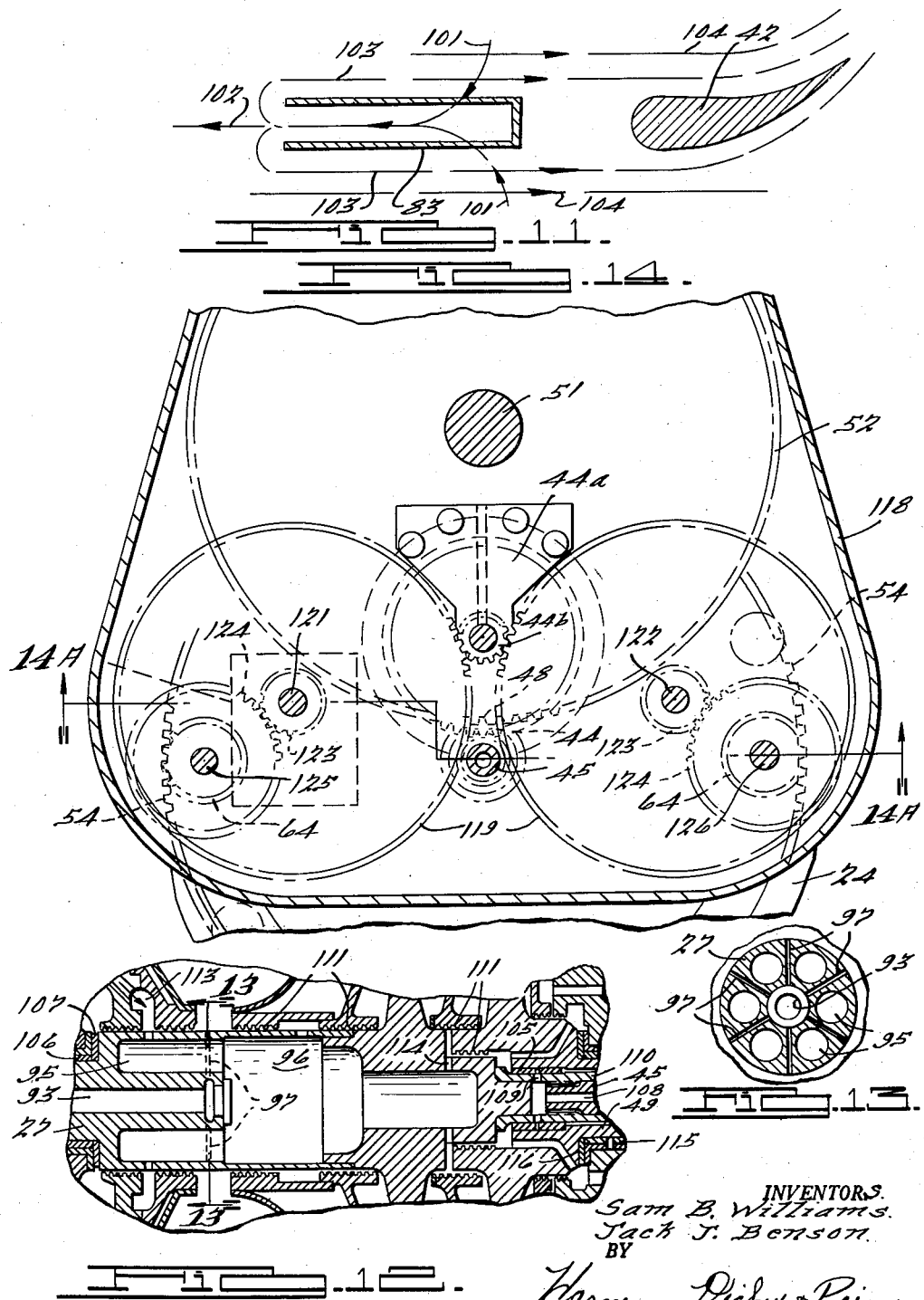

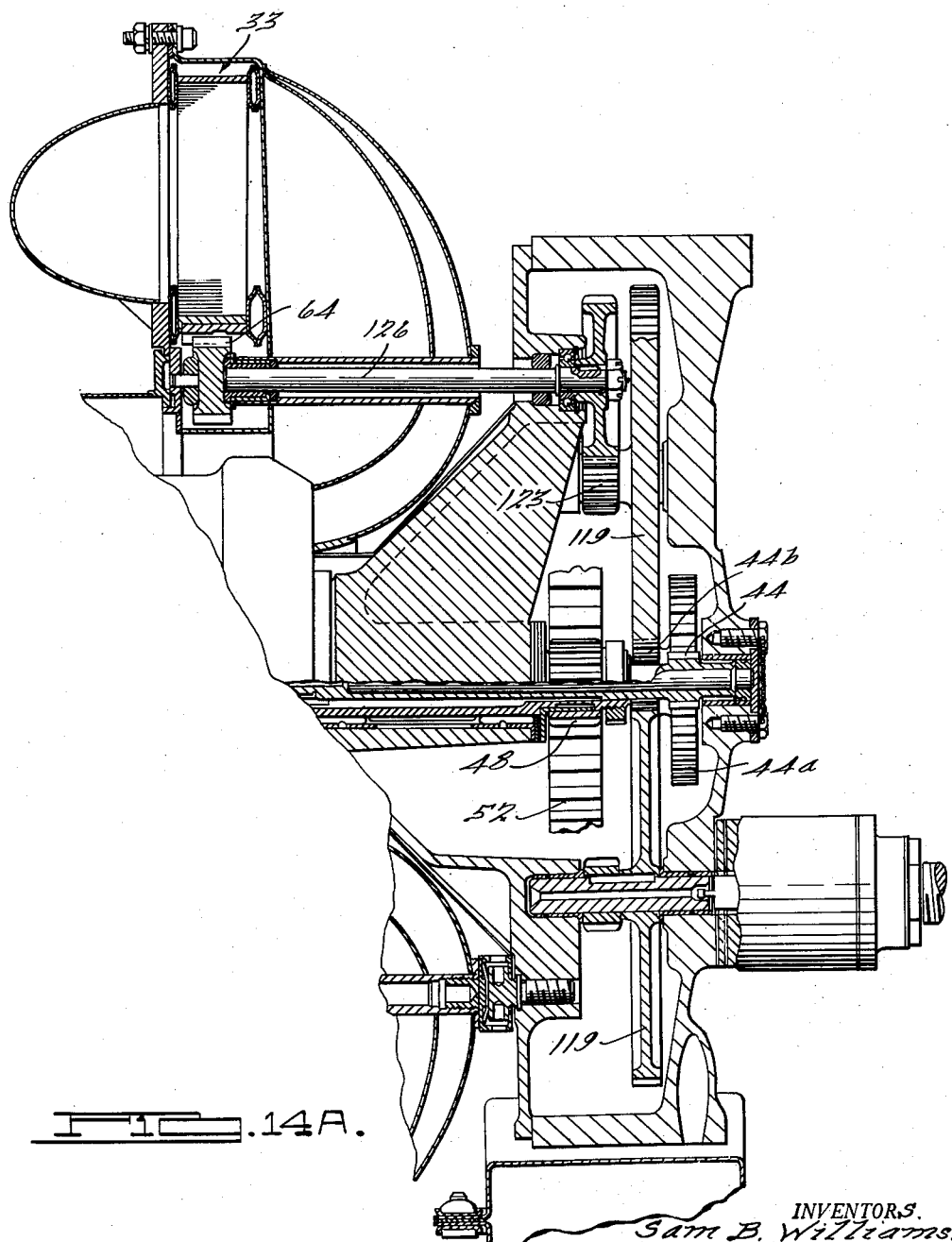

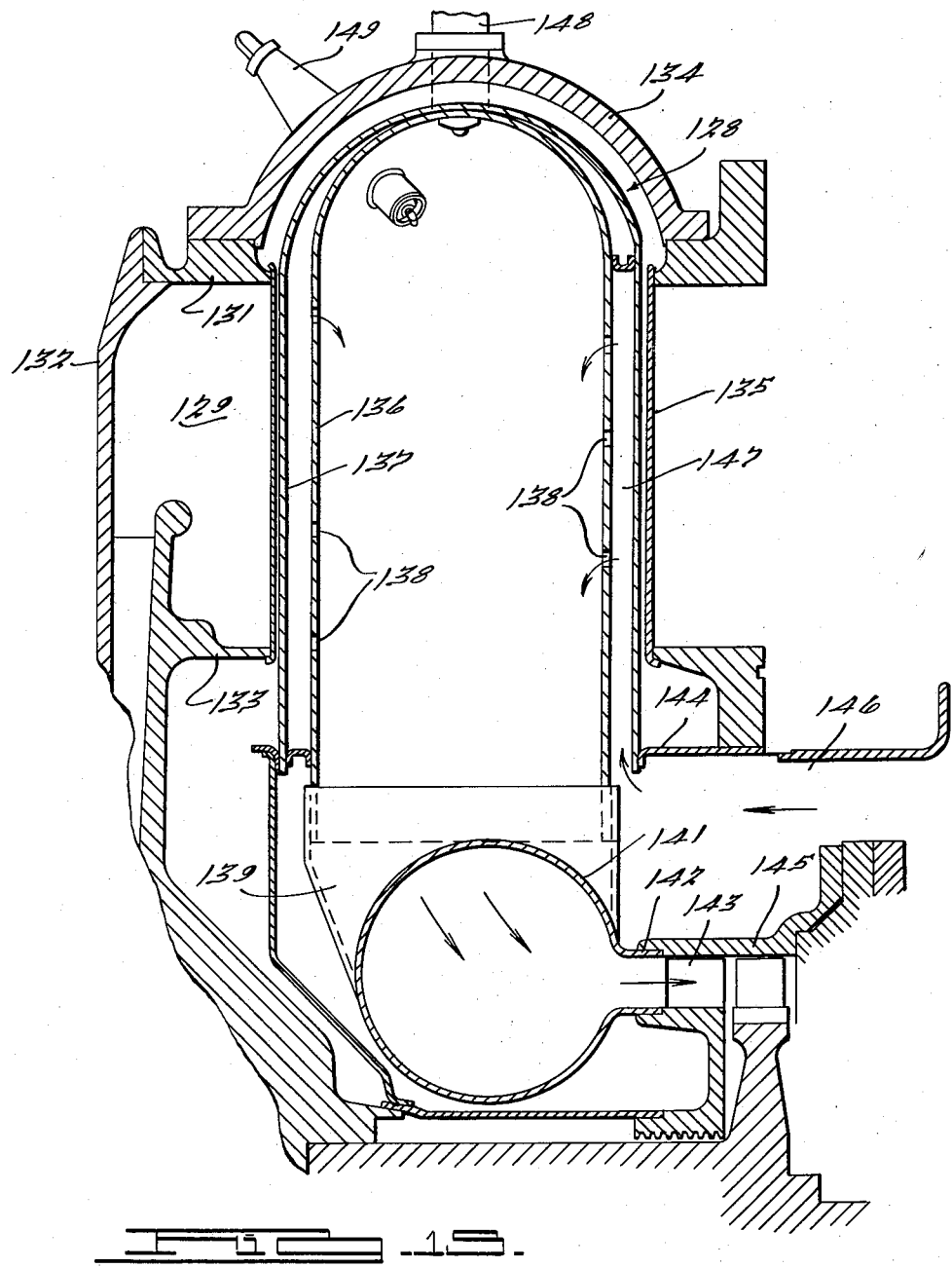

2,969,644

DRIVE MEANS FOR A REGENERATOR IN A REEXPANSION GAS TURBINE ENGINE

Sam B. Williams, Birmingham, and Jack J. Benson, Detroit, Mich., assignors to Williams Research Corporation, Birmingham, Mich., a corporation of Michigan Original application Oct. 24, 1955, Ser. No. 542,328. Divided and this application Dec. 12, 1956, Ser. No. 630,429

7 Claims. (Cl. 60—39.16)

This invention relates to gas turbines, and contemplates improvements in the general construction as well as the component parts of such devices. This application is a division of application Serial No. 542,328, filed October 24, 1955.

It is an object of the invention to provide a gas turbine having superior overall constructional characteristics and in which the components are integrated into a structurally sound unit having a wide variety of industrial applications.

It is a further object to provide a gas turbine of this nature which is extremely compact and light and has a low fuel consumption, being thus adapted for special installations such as the rotor drive for a helicopter.

It is another object to provide an improved gas turbine of this nature which includes novel means for supporting the compressor, power and accessory shafts, and further includes improved means for assuring the retention of lubricant in the bearing spaces.

It is a further object to provide an improved gas turbine construction of this character in which the compressor shaft may be utilized for conducting compressed air to the vicinity of the oil seals for lubricant retention purposes and also may carry fuel to the combustion chamber.

Other objects, features and advantages of the present invention will become apparent from the subsequent description, taken in conjunction with the accompanying drawings.

In the drawings:

Figure 1 is a cross-sectional view in elevation of the novel gas turbine of this invention, showing the relation of the various components, the upper half of the section being taken through a compressor outlet duct and the lower half through an exhaust duct, parts being broken away for clarity, the heat exchanger drive and seals being omitted;

Figure 2 is a perspective view of one end of the casing containing the reversing duct work for the compressor outlet passages and the exhaust passages;

Figure 3 is a detail view of the heat exchanger showing the location of the high pressure seals;

Figure 4 is a fragmentary perspective view in cross section of the heat exchanger matrix showing the construction of the high pressure seal;

Figure 5 is a view similar to Figure 4 showing the location and construction of the low pressure seals;

Figure 6 is a perspective view of one half of the combustion chamber, showing the location of the secondary air vanes and the annular primary air passages;

Figure 7 is a perspective view of the other half of the combustion chamber showing its annular primary air passages;

Figure 8 is a perspective view of the combustion chamber in assembled condition showing the turbine enclosing shroud;

Figure 9 is an enlarged fragmentary cross-sectional view showing the relation of the combustion chamber, fuel injection passages and turbine blades;

Figure 10 is a fragmentary view taken along the line 10—10 of Figure 9 and showing a portion of the annular passage leading from the combustion chamber to the nozzle guide vanes;

Figure 11 is a fragmentary cross-sectional view taken along the line 11—11 of Figure 9 and showing schematically the manner in which the secondary air serves to cool the nozzle guide vanes;

Figure 12 is an enlarged fragmentary view of the shaft arrangement of Figure 1 showing the bearing construction therefor;

Figure 13 is a fragmentary cross-sectional view taken along the line 13—13 of Figure 12 showing the disposition of the radial fuel slinger passages between the seal pressurizing air passages;

Figure 14 is a cross-sectional view taken along the line 14—14 of Figure 1 and showing the main and accessory gear drive trains;

Figure 14A is a cross-sectional view taken along the line 14A—14A of Figure 14 and showing further details of the matrix gear drive; and Figure 15 is a fragmentary cross-sectional view showing a modified type of combustion chamber which may be used in the combination.

General description

The novel gas turbine shown in the drawings is an open cycle turbine of the free or loose wheel type in which the first stage turbine wheel drives the compressor and accessories, and the second stage turbine wheel, having no mechanical connection with the first stage, drives the main output shaft through a single stage reduction gear. The turbine employs a radial compressor, a heat exchanger of the rotating matrix type and reverse flow of the preheated air to an annular combustion chamber with fuel entering from the rotating compressor shaft.

The gas turbine comprises a casing generally indicated at 21 having a central section 22 and end sections 23 and 24. These sections are so formed as to provide ducts for the gases during their compression and preheating stages, their entrance to the combustion chamber, and their exhaust from the second turbine stage through the heat exchanger to the atmosphere.

Referring specifically to Figure 1, end section 23 of the casing is provided with an annular air intake 25 adapted to draw the air radially inwardly from the atmosphere and direct it axially toward a compressor 26. This compressor is mounted on a shaft 27 and has a plurality of impeller blades 28 which act to pump the air centrifugally in the manner of conventional radial compressors. Disposed outwardly of impeller blades 28 is a compressor diffuser 29 supported between end casing section 23 and an inner casing section 30 having radial and axial portions. Diffuser 29 has a plurality of vanes which guide the compressed air to two outlet collectors 31 formed circumferentially in casing section 22. These outlet collectors lead to a pair of outlet ducts 32 which extend axially between casing section 22 and the axial portion of casing section 30. Ducts 32 lead the compressed air to a heat exchanger generally indicated at 33 which is of the rotating matrix type.

The form of ducts 32 is such that the air leaving these ducts enters heat exchanger 33 through two areas each comprising approximately 60° segments on the face of the annular matrix. This is indicated in Figure 3 wherein reference numerals 34 indicate the areas through which the compressed air passes. After leaving the heat exchanger, the preheated compressed air is turned 180° as indicated by the arrow in the upper part of Figure 1, this redirection being accomplished by the formation of end casing section 24. The construction of this end casing is indicated in Figure 2 wherein the reference numerals 35 indicate the duct sections which receive the compressed air leaving the heat exchanger. Duct sections 35 comprise outer segments of about 60° in casing section 24, are concave in shape so as to redirect the flow of air, and lead into an annular chamber 36 which guides the air toward the combustion area. It may be noted at this point that end casing section 24 is also provided with means for guiding the exhaust gases leaving the turbine to the atmosphere. In particular, an inner annular chamber 37 is provided which leads, by means of a double wall construction, around annular chamber 36 to a pair of exhaust ducts 38 which comprise 120° segments separated from ducts 35 and chamber 36. The exhaust gases are thus reversed in flow before entering the atmosphere so as to pass through the heat exchanger, as described below.

After the compressed air has been reversed by end casing section 24, it flows toward the combustion area, being guided between an annular wall 39 and the turbine shroud ring. The combustion chamber is generally indicated at 41 and is described in detail below, together with the fuel feeding means. The burned gases and secondary or cooling air leaving the combustion chamber pass through first stage nozzles 42 and then through the blades of the first stage turbine 43. This turbine, which is driven by the high velocity gases leaving the first stage nozzles, drives compressor 26 through shaft 27 and also drives an accessory pinion 44, shown at the right hand end of Figure 1, through an accessory shaft 45 splined to shaft 27. As will be later seen, accessory pinion 44 is used to rotate the matrix of heat exchanger 33.

The gases leaving first stage turbine 43 pass through second stage nozzles 46 and then through second stage turbine blades 47. The second stage turbine drives a main reduction gear pinion 48 through a shaft 49, this pinion turning a final output shaft 51 through a gear 52. The constructional details of shafts 27, 45 and 49 as well as the means by which they are supported and lubricated are described in detail below.

After leaving the second stage turbine, the exhaust gases pass through annular chamber 37 in end casing section 24 and are reversed in flow 180°, leaving the end casing section through ducts 38. These ducts, which comprise two separate 120° segments as described above, lead the exhaust gases through the rotating matrix of heat exchanger 33, heating the matrix and serving to cool the exhaust gases. These gases then leave the engine through two exhaust pipes 53 leading from the opposite side of matrix 33.

*Heat exchanger*

The details of construction of heat exchanger 33 and its sealing means are best shown in Figures 3, 4 and 5. The exchanger consists of an internal drive gear and hub 54 onto which has been wound, in alternate relation, a corrugated sheet metal strip 55 and a flat sheet metal strip 56. Portions of these strips are shown in enlarged form in Figure 4. The hub and matrix are secured together by any appropriate means such as braising, and the end faces of the matrix and hub are ground or otherwise provided with flat surfaces. The assembly thus forms a rigid annular disk with many small air flow passages extending axially through the matrix as formed by the flat and corrugated strips.

Since the compressed air passing through face segments 34 of the heat exchanger have considerable pressure, perhaps four atmospheres, and the exhaust gases passing through segments 38 are at approximately atmospheric pressure, it is necessary to provide seals between the rotor face and the duct work to prevent leakage. In the present embodiment, a pair of high pressure sealing members generally indicated at 57 are provided for each of the 60° segments 34, one of each pair of sealing members being provided on each face of rotor 33. These sealing members provide seals between one rotor face and the end faces of the two ducts 32 feeding compressor discharge air to the heat exchanger rotor, and between the opposite rotor face and ducts 35 formed in end casing section 24.

Seals 57 are omitted from Figure 1 for purposes of clarity.

Each of the sealing members 57 is somewhat kidney-shaped and is secured in any appropriate manner to the stationary duct work. The seal consists of a bellows 58 of looped continuous form which is expandable in a direction parallel to the flow of air. This bellows, which may comprise a pair of elastic sheets secured at their outer edges, is provided on opposite sides with a pair of flexible flat shoes 59 and 61 which are adapted to provide rubbing and sealing contact with the adjacent surfaces to be sealed. In particular, as shown in Figure 4, shoes 61 are engageable with the flat end surfaces of matrix 33 while shoes 59 provide sealing contact against the ends of ducts 32 and 35. A pair of fluid connections 62 are provided in the outer corners of each sealing member 57 for the purpose of conducting pressurizing fluid through bellows 58. Shoes 59 and 61 are preferably narrower than bellows 58 so that the elastic sheets comprising the bellows may be secured together after the shoes have been attached to the sheets.

In operation, bellows 58 of each sealing member 57 is pressurized with water, air or any other suitable fluid conducted through the bellows by connections 62, these connections being accessible from outside the turbine casing. This pressurization spreads shoes 59 and 61 apart, providing the necessary force to conform the shoes to their adjacent sealing surfaces, thus providing efficient sealing contact. The arrangement insures that any distortion or axial movement of heat exchanger 33 due to thermal differentials during operation will not cause undesirable leakage of the compressed air. To enhance this action, the entire assembly comprising bellows 58 and shoes 59 and 61 is relatively thin and will be capable of transverse bending to conform to irregularities. Preferably, the pressure of the fluid used in pressurizing bellows 58 should be slightly above the pressure of the gases being sealed. Several different methods may be utilized to obtain this condition. For example, a pressure regulating valve shown schematically at 151 in Figure 3 may be provided which maintains the pressurizing fluid at the proper pressure value. The pressurizing fluid may come from an external source and could be a coolant which would prevent the seals from becoming overheated. Alternatively, pressurized air delivered from compressor 26 may be used for the seals. In the case of the two seals engaging ducts 32, this pressurization air may be obtained through ram tubes 152 shown in Figure 1, located adjacent compressor diffuser 29. Pressurization air for those seals engageable with ducts 35 may be obtained by tubes 153 which transfer static pressure from the upstream side of heat exchanger 33, such pressure normally being slightly higher than that in ducts 35.

Sealing means are also provided for preventing by-passing of the exhaust gases around the rotating matrix of heat exchanger 33. It will be appreciated that this sealing problem is less critical than that presented by the compressed air because of the lower pressure differentials involved. The sealing means used for this purpose is shown in Figure 5 and comprises a flexible sheet metal band 63 secured to an appropriate portion of casing section 24 and in rubbing contact with the end face of the rotating matrix. Band 63 may be of corrugated shape as shown, and exerts sufficient pressure against the end of matrix 33 to prevent leakage of the exhaust gases. As shown, such seals may be provided at the inner and outer edges of the matrix face, and may also be provided on the opposite face of the matrix adjacent exhaust ducts 53.

As mentioned previously, rotary heat exchanger 33 is provided with an internal drive gear 54 by means of which the matrix is continuously rotated during operation. The means for radially supporting the heat exchanger rotor comprises the pinions (described below) which mesh with gear 54 and for driving purposes. These pinions are indicated at 64 in Figure 3. A pair of rollers indicated at 65 may also be provided for additional radial support of the heat exchanger. The exchanger is supported axially by aforementioned seals 57 and 63 engageable with the end faces of the matrix.

Combustion chamber and fuel feeding system

The constructional details of combustion chamber 41 are best seen in Figures 6–10, and its location with respect to the other turbine components is shown in Figure 1. The chamber is of generally annular shape and is disposed inwardly of ducts 32 and annular guide wall 39, a spark plug 40 being mounted in wall 39 and extending into the chamber for starting purposes. The end of wall 39 furthest from annular chamber 36 is curved inwardly as shown at 66 in Figure 1, combustion chamber 41 being in adjacent spaced relation with this curved portion. Although the manner of fabrication of combustion chamber 41 may be varied within the principles of the invention, the combustion chamber in the illustrated embodiment is shown as being composed of two sections 67 and 68 shown in Figures 6 and 7, respectively. These sections are provided with mating flanges 69 and 70 which are bolted together when the combustion chamber is assembled as shown in Figure 8. Flange 70 is of somewhat larger diameter than flange 69, thus providing an annular slot 71 when the chamber is assembled for purposes now to be described.

Means are provided for conducting primary air, that is, air used directly for combustion, into intimate mixing contact with the fuel, and for conducting secondary or cooling air into the combustion chamber in proper proportions and with such flow characteristics as to achieve maximum cooling efficiency. The primary air entrance means is provided by annular slot 71 together with a plurality of additional openings or slots formed between shell-like members of which each of the chamber sections 67 and 68 is composed. These shell sections and their manner of assembly are best seen in Figures 1, 6 and 7. Combustion chamber section 67, for example, is built up of sections 72, 73 and 74 which are of successively increasing diameter. Each of these shell sections is concave inwardly, and the sections have edges which overlap sufficiently to form the chamber wall. Section 68 of the combustion chamber is constructed of shell sections 75, 76, 77 and 78 of progressively increasing diameter, section 78 being curved to form the outer wall of the combustion chamber and flange 70. Shell sections 75–78 extend radially outwardly further than sections 72–74, the portion of combustion chamber section 67 outwardly of shell sections 72–74 being occupied by the annular exit opening for the burned gases, described below. The overlapping edges of shell sections 72–74 and 75–78 are connected by sheet metal clips 79 spaced circumferentially around these edges, as shown in Figure 9. Clips 79 are of S-shaped cross section and are welded or otherwise secured to the shell edges, holding them in overlapping spaced relation. If desired, the edges may also be crimped at spaced points to maintain the proper slot width.

The arrangement of shell sections 72–74 and 75–78 is such that their overlapping spaced edges present annular slots or openings in the path of the approaching air within annular wall 39. In particular, the space 81 shown in Figure 9 between curved wall portion 66 and combustion chamber section 68 will carry compressed air into the three annular openings formed between sections 75, 76, 77 and 78. Compressed air reaching the annular space 82 adjacent sections 72, 73 and 74 will flow into the two annular slots provided between the overlapping edges of these sections. The manner in which compressed air is admitted to annular space 82 is described below.

The means for admitting secondary or cooling air to the combustion chamber comprises a plurality of ports 83 in section 67 of the combustion chamber. Ports 83 are of U-shaped cross section and are disposed in circumferentially spaced relation around chamber section 67, the ports extending through an annular wall 84 which forms part of the exit opening of the combustion chamber. Wall 84 is provided with flange 69 which, as stated previously, is secured to flange 71 of shell section 68. Spacers 85 between these flanges serve to maintain the annular slot between these flanges. Wall 84 curves inwardly from flange 69 and cooperates with a curved wall 86 to form the combustion chamber exit opening, which comprises an annular passage (interrupted by spaced ports 83) leading radially inwardly and then axially to the first stage nozzle vanes. Ports 83 are disposed in cutouts of walls 84 and 86, being secured to these walls by welding or other means.

As seen best in Figure 9, each port 83 has an outer or leading edge 87 through which the air will enter and an inner or trailing edge 88 through which the air will leave, both of these edges conforming to the U-shape of the port. The inner or base portion 89 of edge 88 extends radially inwardly from the outer flanged edge of ring 74 so that some air will flow into the annular space 82 disposed between wall 86 and shaft enclosing wall 91. The base portion 92 of each port 83 is formed in sloping fashion to facilitate this air flow. It will thus be seen that ports 83 serve not only to conduct secondary or cooling air into combustion chamber 41 but also serve to conduct primary air to one side of the chamber, through the slots between shell sections 72, 73 and 74.

The fuel feeding system is best seen in Figures 1, 9, 12 and 13 and comprises a plugged central bore 93 in shaft 27 which leads the fuel from an inlet port 94 to the vicinity of the combustion chamber. A plurality of open-ended axial bores 95 surround the end of bore 93 and lead into a chamber 96 in shaft 27, the purpose of which is described below. Extending radially from bore 93 between bores 95 are a plurality of fuel slinger ports 97. During operation, the fuel is ejected by centrifugal force from ports 97 and into the combustion chamber. It will be seen from an examination of Figure 9 that the primary air flow into the combustion chamber through the annular slots between shell sections 72–78 will flow transversely with respect to the sprayed fuel, thus facilitating turbulent flow and the formation of vortices which lead to excellent mixing of the fuel and air for combustion. The reversal of flow of the primary air within the combustion chamber caused by the positioning of the annular primary air slots also tends to provide a uniform final outlet temperature distribution from the combustion chamber.

The burned gases leave the combustion chamber by flowing through the annular passage formed between walls 84 and 86, passing around ports 83. As seen in Figures 1 and 9, the products of combustion are thus led radially inwardly toward the first stage nozzle vanes 42 which are supported by a hub 98 to which wall 86 is connected. A shroud ring 99, seen best in Figures 1, 8 and 9, surrounds blades 42 and is connected to wall 84, this shroud ring also serving to surround first stage turbine blades 43.

The arrangement of ports 83 is such as to facilitate the cooling of first stage nozzle blades 42 during operation of the turbine. The manner in which this cooling is accomplished is illustrated in Figure 11. The ports 83 are equal in number to the first stage turbine nozzle vanes and are positioned with respect to the nozzle vanes such that the relatively cool secondary air will reverse direction within the combustion chamber and will flow back over the outer surfaces of the port walls in line with the nozzle vanes, thus tending to provide them with a boundary layer of relatively cool air.

In Figure 11, the converging flow lines 101 indicate the secondary air flowing into a port 83 through its leading edge 87. This air will enter the combustion chamber, one portion of it mixing with the burned gases as indicated by the flow line 102. Other portions of the secondary air will reverse their flow immediately after entering the combustion chamber because of the pressure within the chamber. These portions, indicated by the flow lines 103, will flow back along the outer surfaces of the U-shaped wall of port 83 through the passage formed by walls 84 and 86. This air will be cool relative to the burned gases indicated by the flow lines 104 which emanate from the combustion chamber. Since each nozzle vane 42 is aligned with a port 83, as shown in Figure 11, the relatively cool air flowing along flow lines 103 will tend to blanket the surfaces of these vanes, preventing them from being overheated by the combustion gases. It will thus be observed that in addition to performing a function in mixing secondary air with the combustion products, ports 83 will serve to keep the individual first stage nozzle vanes at proper operating temperature.

Power and accessory drives

As mentioned previously, first stage turbine 43 drives compressor shaft 27 and accessory shaft 45, while second stage turbine 47 drives main power shaft 51 through shaft 49. The bearing and lubricating arrangement for these shafts are best seen in Figures 1 and 12. Compressor shaft 27 is supported at its right hand end by a bearing 105 and adjacent its opposite end by a bearing 106 (seen in Figure 1). The thrust bearings for shaft 27 are located adjacent bearing 106 and are indicated at 107 in Figure 1. Oil for bearing 105 is supplied by an axial passage 108 in shaft 45 and radial holes 109 in an intermediate member 110 which is fixed to shaft 27 and supported by bearing 105. Accessory shaft 45 is splined to compressor shaft 27 by means of this intermediate member. Bearing 105 floats in shaft 49, and the oil for this bearing is retained by one of a plurality of labyrinth seals 111 which are disposed adjacent the rotating components. These seals are pressurized with compressor discharge air fed in from collector 31 through a conduit 112 to the seal system, a portion of this conduit being shown in Figure 1. Conduit 112 leads to the labyrinth seal system through an annular chamber 113 in the inner portion of casing section 30, this chamber being connected by radial passages to axial bores 95 in compressor shaft 27. The compressed air is thus conducted to chamber 96 in shaft 27, from which it is led to the labyrinth 111 adjacent bearing 105 by passages 114. The compressed air helps in this manner to prevent leakages of lubricating oil from the bearings. It will be noted that air thus supplied to chamber 96 also serves to cool the wheels of turbine blades 43 and 47 through their adjacent labyrinths. Shaft 49 surrounds shaft 45 and is coaxial therewith. Floating bearings 115 serve as radial supports for shaft 49, and a thrust bearing 116 is also provided therefor. Shaft 45 is supported at one end by its splined connection to shaft 27 and at the opposite end by a bearing 117 in gear housing cover 118.

The gearing arrangement for the main drive and the heat exchanger rotor drive are shown in Figures 1 and 14. Main drive pinion 48 meshes with gear 52 which is mounted on main drive shaft 51. Accessory drive pinion 44 meshes with a gear 44a supported for rotation on a stationary axis within the housing, as seen in Figure 14A. A pinion 44b, is fixed to gear 44a for coaxial rotation therewith and meshes with a pair of oppositely rotating gears 119 on shafts 121 and 122, these shafts being spaced symmetrically on either side of shaft 45. Intermediate pinions 123 are fixed to shafts 121 and 122 and mesh with intermediate gears 124 disposed on shafts 125 and 126. The latter pair of shafts are likewise symmetrical with respect to shaft 45, these three shafts being disposed in a common horizontal plane. Pinions 64 are secured to shafts 125 and 126, these pinions meshing with opposite sides of internal gear 54 on heat exchanger 33. It will thus be seen that pinions 64 serve as radial supports for the heat exchanger rotor. As indicated previously, additional rollers 65 may also be used for this purpose.

Operation

In operation, air will flow from the atmosphere into air intake 25 and compressor 26 rotated by shaft 27. The compressed air will pass through compressor diffuser 29 and outlet collectors 31 to ducts 32. These ducts will lead the compressed air axially toward the rotating matrix of heat exchanger 33, through which the air will pass. The preheated air will be reversed in flow by end casing section 24 and will flow back toward combustion chamber 41.

Primary air will flow into the combustion chamber through the annular slots provided by the chamber shell sections and will be intimately mixed with fuel fed outwardly by fuel slinger passages 97. The burned gases will flow from the combustion chamber past secondary air ports 83 toward first stage nozzle vanes 42. Secondary air flowing into the combustion chamber through ports 83 will be partially mixed with the burned gases, and portions of the secondary air will reverse their flow and be guided as cooling layers of air along vanes 42.

The burned gases will flow through first stage turbine blades 43 which rotate compressor shaft 27 and accessory shaft 45, the latter serving to drive the matrix of heat exchanger 33 through reduction gearing. After passing through second stage nozzle vanes 46 the gases will flow through second stage turbine blades 47, these blades driving main power shaft 49. The exhaust gases will be reversed in flow direction by end casing section 24 and will flow back through heat exchanger 33 and into the atmosphere.

Combustion chamber of Figure 15

Figure 15 illustrates an alternative construction of the combustion chamber which may be used in conjunction with the other components of the gas turbine described above. This construction utilizes two conventional can type combustion chambers generally indicated at 128, one of these chambers being illustrated in Figure 15. In incorporating this type of combustion chamber in the illustrated embodiment of the gas turbine, each of the ducts 32 leading from compressor collector 29 to heat exchanger 33 would contain one of these burners. In Figure 15, the reference numeral 129 indicates that portion of the construction which is equivalent to duct 32, 131 represents the central casing section and 132 the end casing section corresponding to section 23 in Figure 1. The axial portion of casing section 133, corresponding to casing section 30 in Figure 1, is apertured to accommodate the combustion chamber, and an additional dome-like casing portion 134 could be added to facilitate this enclosure. An annular cylindrical wall 135 extends radially between sections 131 and 133 to seal the combustion chamber from compressed air flowing through duct 129.

The combustion chamber comprises an inner shell 136 and an outer shell 137, these shells being coaxial and joined at their outer dome-like surfaces. Inner shell 136 is provided with a plurality of apertures 138 and is secured at its open end to a connecting section 139 which leads to an annular scroll 141 for the reception of combustion gases. Scroll 141 has an annular port 142 leading to first stage nozzle vanes 143. Shell 137 is unapertured and is secured at its open end to a wall 144 which is the equivalent of wall 39 in the embodiment of Figure 1. This wall is spaced outwardly from the shroud ring 145 and the annular duct 146 formed therebetween conducts compressed and preheated air back toward the combustion chamber as shown by the flow arrow. A conventional spray nozzle 148 is provided in this embodiment, the nozzle extending through casing section 134 and the outer ends of domes 136 and 137. A spark plug 149 is provided as in the previous embodiment for initially igniting the mixture.

In operation of the combustion chamber of Figure 15, compressed air will flow through duct 129 past combustion chamber 128 by virtue of sealing wall 135 and will enter the heat exchanger as in the previous embodiment. The preheated air will return through duct 146 and will flow radially outwardly within the space 147 between inner shell 136 and outer shell 137 of the combustion chamber. The air will enter perforations 138 of the inner shell where it will be mixed with fuel injected from nozzle 148. The burned gases will pass through connection 139 to scroll 141, flowing from this scroll to nozzle vanes 143.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A gas turbine comprising a radial compressor, a rotating matrix heat exchanger axially spaced from said compressor, duct means connecting said compressor and said heat exchanger, an annular combustion chamber between said compressor and said matrix, reversing duct work leading from said matrix to said combustion chamber, first and second stage turbines spaced axially from said combustion chamber and concentric with and spaced inwardly from said matrix, a compressor shaft connecting said first stage turbine to said compressor, the inner portion of said combustion chamber being closely adjacent said shaft, a hollow drive shaft connected to said second stage turbine and extending in the opposite direction from said compressor shaft, a bearing carried by one end of said drive shaft and rotatably supporting the adjacent end of said compressor shaft, an accessory shaft rotatably mounted within said drive shaft and non-rotatably connected to said compressor shaft, a drive pinion on said drive shaft, and an accessory pinion on said accessory shaft and adjacent said drive pinion.

2. A gas turbine comprising a compressor, a rotating matrix heat exchanger, a combustion chamber, first stage nozzle vanes connected to said chamber, a first stage turbine blade wheel adjacent said nozzle vanes, a compressor shaft connecting said wheel with said compressor, second stage nozzle vanes, a second stage turbine blade wheel having a central opening, a hollow power output shaft connected to said second stage wheel and extending in the opposite direction from said compressor shaft, a bearing carried in said opening, an end portion integrally connected to said compressor shaft and disposed within said bearing in supported relation therewith, and a matrix drive shaft disposed within said output shaft and non-rotatably connected to said compressor shaft end portion.

3. A gas turbine comprising a compressor, a combustion chamber, first stage nozzle vanes connected to said chamber, a first stage turbine blade wheel adjacent to said nozzle vanes, a compressor shaft connecting said wheel with said compressor, second stage nozzle vanes, a second stage turbine blade wheel having a central opening, a hollow power output shaft connected to said second stage wheel and extending in the opposite direction from said compressor shaft, a bearing carried in said opening, an end portion integrally connected to said compressor shaft and disposed within said bearing in supported relation therewith, and an accessory drive shaft disposed within said output shaft and non-rotatably connected to said compressor shaft end portion.

4. The combination according to claim 3, further provided with a lubricant retaining seal adjacent to said bearing, an axial bore in said compressor shaft, means for conducting compressed air to said bore, and a passage leading from said bore to the vicinity of said seal on the side thereof the opposite said bearing, whereby air pressure will aid in preventing lubricant from escaping through said seal.

5. The combination according to claim 4, further provided with means in said compressor shaft separate from said bore for conducting fuel into said combustion chamber.

6. The combination according to claim 3, said compressor shaft end portion being of reduced diameter, a sleeve connecting said reduced end portion and the adjacent end of said accessory drive shaft, said bearing rotatably supporting said sleeve, and oil passageway means in said accessory drive shaft and said sleeve leading to said bearing.

7. In a gas turbine, a compressor, an annular combustion chamber axially spaced from said compressor, first stage nozzle vanes connected to said chamber, first stage turbine blades adjacent said nozzle vanes, a compressor shaft connecting said turbine blades with said compressor and passing through said annular combustion chamber, a first axial bore in said shaft leading from one end of the shaft in the vicinity of said compressor to the vicinity of said combustion chamber, a second axial bore in said shaft leading from the vicinity of said combustion chamber toward the other end of said shaft, means for preventing communication between said bores, means for conducting fuel into said first bore at the end thereof adjacent said compressor, a plurality of radially extending fuel slinger ports leading from the other end of said first bore into said combustion chamber, a plurality of passages leading from the outside of said shaft to said second bore between said fuel slinger ports, means for conducting compressed air to said passages, a second stage turbine shaft having a central opening, an end portion integrally connected to said other end of the compressor shaft and disposed within said central opening, a bearing carried within said central opening and supporting said end portion, a lubricant retaining seal adjacent said bearing, and a compressed air conduit leading from said second bore to the vicinity of said seal on the side thereof opposite said bearing, whereby the compressed air will aid in preventing lubricant leakage through said seal.

References Cited in the file of this patent

UNITED STATES PATENTS

| 448,874 | Brewer | Mar. 24, 1891 |
|---|---|---|
| 2,173,489 | Voigt | Sept. 19, 1939 |
| 2,632,626 | McClintock | Mar. 24, 1953 |
| 2,665,549 | Newcomb | Jan. 12, 1954 |
| 2,707,865 | Huebner | May 10, 1955 |
| 2,795,928 | Huebner et al. | June 18, 1957 |
| 2,804,747 | Pavlecka | Sept. 3, 1957 |

FOREIGN PATENTS

| 595,357 | Great Britain | Dec. 3, 1947 |
|---|---|---|
| 459,368 | Italy | Sept. 5, 1950 |